3,405,064
LUBRICATING OIL COMPOSITION
Clark O. Miller, Willoughby, Ohio, assignor to The Lubrizol Corporation, Wickliffe, Ohio, a corporation of Ohio
No Drawing. Filed June 6, 1963, Ser. No. 285,910
9 Claims. (Cl. 252—51.5)

ABSTRACT OF THE DISCLOSURE

Mineral lubricating oil containing a nitrogen-containing composition characterized by amidine linkages and prepared by reacting aliphatic amines with an aliphatic branched carboxylic acid acylating agent having 15–21 carbon atoms.

This invention relates to novel compositions of matter and in a more particular sense to oil-soluble nitrogen compositions. The compositions of this invention are useful as additives in hydrocarbon oils and especially lubricating compositions for internal combustion engines such as two-cycle (i.e., two-stroke) spark ignition engines.

The lubrication of two-cycle internal combustion engines is provided by an oil-fuel mixture. In this situation, the combustion characteristics of the oil are as important as its lubricating characteristics in maintaining proper performance of the engine. While mineral lubricating oils provide a desirable and economical source of the oil for use in such engines, they are unfortunately characterized by a tendency to form harmful products of combustion. Such products eventually agglomerate to form deposits in the engine and are a principal cause of not only excessive engine wear but also other difficulties such as spark plug fouling, piston ring sticking, etc. Hence, in recent years a great deal of effort has been devoted to the improvement in the combustion characteristics of lubricating oils for use in two-cycle engines.

Accordingly it is a principal object of this invention to provide additives for use in lubricating compositions, especially lubricating compositions for use in two-cycle engines.

It is also an object of this invention to provide additives useful in hydrocarbon oils.

It is also an object of this invention to provide lubricating compositions.

It is further an object of this invention to provide concentrates containing additives for use in hydrocarbon oil.

It is further an object of this invention to provide novel compositions of matter.

It is further an object of this invention to provide a process for preparing novel compositions of matter.

These and other objects are attained in accordance with this invention by providing an oil-soluble, nitrogen-containing composition prepared by the process comprising heating at a temperature above about 100° C. a mixture comprising an amine selected from the class consisting of alkyl amines, aminoalkyl amines, and hydroxy-alkyl amines with at least about 0.5 equivalent of an acid-producing compound selected from the class consisting of branched chain acids having the structural formula

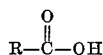

and the anhydrides and the esters thereof, in which structural formula R is a branched chain, hydrocarbon radical having from 14 to 20 saturated aliphatic carbon atoms in the principal chain and at least one lower acyclic, pendant aliphatic group.

The above process can be carried out simply by mixing the two reactants and heating the mixture to a temperature of at least about 100° C., or alternatively by adding one reactant to the other. The presence in the process of a solvent is often advantageous to facilitate mixing and temperature control. The solvent may be a hydrocarbon or an inert polar solvent. It is illustrated by benzene, toluene, xylene, naphtha, n-hexane, cyclohexane, dodecane, octane, chlorobenzene, ethylene dichloride, dioxane, ether, chloroform, carbon tetrachloride, or nitrobenzene.

The reaction which characterizes the above process is believed to result in a product having predominantly amide or amidine linkages, the latter including both linear and cyclic amidine linkages such as are found in imidazolines. The product most likely contains a mixture of these linkages. In case of an amine reactant containing a tertiary amino group, the product will contain amine carboxylate salt linkages. The formation of these linkages from the reaction of an alkylene amine and an acid is accompanied with the formation of water and may be represented by the following equations:

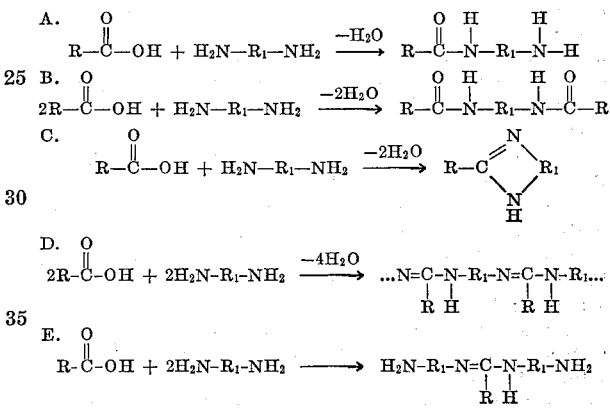

wherein R is as defined previously and $R_1$ is an alkylene radical. It will be noted that both oxygen atoms of the acid reactant may be replaced with nitrogen atoms to form amidine linkages. It will be noted also that if an ester is used in lieu of the acid as the reactant, an alcohol will be formed as a byproduct.

The temperature at which the process is carried out depends primarily upon the nature of the reactants used and the product desired. In general, the reaction temperature should be at least about 100° C., preferably between 120° C. and 250° C. A still higher temperature may be used provided that it does not exceed the decomposition point of the reaction mixture. Also a relatively high temperature, usually above 150° C., is preferred to give a product having predominantly the amidine linkages.

The relative proportions of the two reactants depend upon the number of the nitrogen atoms in the amine reactant, the type of the linkages desired in the product, and the stoichiometry of formation of such linkages. The preferred ratio of the reactants is one equivalent of the acid-producing reactant to one to two equivalents of the amine. In some instances, as much as two equivalents of the acid-producing reactant may be used for each equivalent of the amine. To illustrate, as much as 10 equivalents and as little as 0.5 equivalent of an acid may be used for one mole of an alkylene amine having 5 nitrogen atoms per molecule. The equivalent weight of the acid-producing compound is based upon the number of the carboxylic radicals and that of the amine is based upon the number of amino radicals in a molecule.

The critical aspect of the nitrogen-containing compositions of this invention resides in the structure of the R radical derived from the acid-producing reactant. This radical should contain, first, a principal chain having from 14 to 20 saturated, aliphatic carbon atoms and, second, at least one but no more than about four pendant groups which are acyclic aliphatic radicals. The criticality is associated with the oil-solubility and peculiar effectiveness of the nitrogen-containing compositions characterized by such an R radical in the applications contemplated for this invention.

The principal chain of the R radical is exemplified by a radical derived from tetradecane, pentadecane, hexadecane, heptadecane, octadecane, and eicosane. The pendant group is preferably a lower acylclic alkyl radical such as methyl, ethyl, n-propyl, isopropyl, n-butyl, isobutyl, tert-butyl, n-hexyl, or other radical having less than about 6 carbon atoms. The pendant group may also be a polar-substituted alkyl radical such as chloromethyl, bromobutyl, methoxyethyl, or the like, but it preferably contains no more than one polar substituent per radical. Specific examples of the acid-producing compounds having such a R radical are the isoaliphatic acids such as 10-methyl-tetradecanoic acid, 11-methyl-pentadecanoic acid, 3-ethyl-hexadecanoic acid, 15-methyl-heptadecanoic acid, 16-methyl-heptadecanoic acid, 6-methyl-octadecanoic acid, 8-methyl-octadecanoic acid, 10-methyl-octadecanoic acid, 14-methyl-octadeanoic acid, 16-methyl-octadecanoic acid, 15-ethyl-heptadecanoi acid, 3-chloromethyl-nonadecanoic acid, 2 - methyl - eicosanoic acid, 9,10 - dimethyl - octadecanoic acid, 7,8,9,10-tetramethyl-octadecanoic acid, and 2,9,10-trimethyl-octadecanoic acid.

An especially useful class of iso-aliphatic acids are the mixtures of branch-chain acids prepared by the isomerization of commercial fatty acids. A particularly useful method comprises the isomerization of an unsaturated fatty acid having from 16 to 20 carbon atoms, by heating it at a temperature above about 250° C. and a pressure between about 200 and 700 p.s.i. (pounds per square inch), distilling the crude isomerized acid, and hydrogenating the distillate to produce a substantially saturated isomerized acid. The isomerization is promoted by a catalyst such as mineral clay, diatomaceous earth, aluminum chloride, zinc chloride, ferric chloride, or some other Friedel-Crafts catalyst. The concentration of the catalyst may be as low as 0.01%, or more often from 0.1% to 3%, by weight of the isomerization mixture. Water also promotes the isomerization and a small amount, from 0.1% to 5% by weight, of water may thus be advantageously added to the isomerization mixture.

A side reaction product of the isomerization process is a polymerized unsaturated fatty acid. This product can be removed as the residue by distillation or as the insoluble fraction by solvent extraction, precipitation, or filtration of the reaction mixture. On the other hand, the desired isomerized product can be recovered as the distillate, usually by heating the reaction mixture under vacuum. The distillate may contain also the unused portion of the unsaturated fatty acid. However, upon hydrogenation, the isomerized acid and the unused starting acid yield significantly different products which can be separated by solvent extraction and precipitation. Thus, the hydrogenated product of the unused starting acid will be considerably higher melting and less soluble in a solvent such as acetone. The hydrogenation can be effected by any one of the well-known methods such as catalytic hydrogenation in the presence of Raney nickel or platinum. The product of the hydrogenation should have an iodine number less than about 10.

The mechanism of the isomerization is not known. It is known, however, that the product of the isomerization is monomeric but structurally different from the starting acid in that its hydrocarbon radical now contains at least one branched chain.

The unsaturated fatty acids from which the iso-aliphatic acids may be derived include, in addition to oleic acid mentioned above, lineoleic acid, linolenic acid, or commercial fatty acid mixtures such as tall oil acids containing a substantial proportion of unsaturated fatty acids.

The anhydrides and the esters of the branched chain acids illustrated above likewise are useful for the preparation of the nitrogen-containing compositions of this invention. The anhydrides may be obtained, for instance, by the reaction of a halide of such an acid with an alkaline metal salt of such an acid at a relatively high temperature. The esters useful herein include principally those derived from relatively low boiling alcohols such as methanol, ethanol, isopropanol, n-butanol, n-pentanol, and other alcohols boiling below about 120° C. In some instances, an aromatic ester such as phenyl, tolyl, or xylyl ester of the acid likewise may be used. The preparation of the esters can be effected by a direct esterification of the acid with the alcohol or by the reaction of the acid halide with an alkali metal alcoholate. The reaction conditions employed for preparing the anhydrides and the esters by these and other methods are known in the art.

The amines useful for preparing the oil-soluble, nitrogen-containing compositions of this invention include alkyl amines, amino-alkyl amines, and hydroxy-alkyl amines. The alkyl amines are illustrated by, e.g., methylamine, N-methyl-ethylamine, N-methyl-octylamine, N-cyclohexyl-octylamine, cyclohexylamine, dibutylamine, dodecylamine, benzylamine, octadecylamine, triethylamine, and dicyclohexylamine. The primary amines and the secondary amines are preferred and those having a total of no more than 30 carbon atoms in a molecule are especially useful.

The amino-alkyl amines contemplated for use herein are for the most part the alkylene amines conforming to the structure

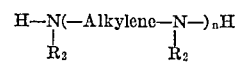

in which $n$ is an integer preferably less than ten and $R_2$ is a substantially hydrocarbon preferably having up to about 30 carbon atoms. The alkylene radical is exemplified by an ethylene, propylene, butylene, trimethylene, tetramethylene, pentamethylene, hexamethylene, octamethylene, or decamethylene radical. Specific examples of such alkylene amines are ethylenediamine, diethylenetriamine, triethylenetetramine, propylene diamine, tripropylenetetramine, tetraethylenepentamine, trimethylenediamine, pentaethylenetetramine, di(trimethylene)triamine, tri(hexamethylene)tetramine, decamethylenediamine N-octyl trimethylenediamine, N,N'-dioctyl propylene-diamine, N-dodecyl ethylenediamine, and N,N'-dimethyl propylenediamine.

The alkylene amines include also those containing cyclic linkages such as are found in imidazolidines, imidazolines, and piperazines. Cyclic polyamines in which the amino nitrogen atoms are separated by at least one and no more than 3 carbon atoms are especially useful. Such amines may be illustrated by imidazoline, piperazine, 2-methyl-imidazoline, 2-heptyl-1-(2-aminopropyl)imidazolidine, 4-methyl-imidazoline, 1,3-bis(2-aminoethyl)imidazoline, pyrimidine, 1-(2-aminopropyl)piperazine, 1,4-bis(2-aminoethyl)piperazine, 1-(2-(2-aminoethylamine)ethyl)piperazine and 2-methyl-1-(2-aminobutyl)piperazine. Higher homologues such as are obtained by condensing two or more of the above-illustrated alkylene amines likewise are useful.

The hydroxy-alkyl amines include for the most part the above-illustrated alkyl amines and alkylene amines containing one or more hydroxy radicals on the alkyl groups, preferably no more than one hydroxy radical on each alkyl group. Examples of the hydroxy-alkyl amines are 2-hydroxyethylamine, bis(2-hydroxyethyl)amine, tris(2-hydroxyethyl)amine, 3-hydroxypropylamine, bis(3-hydroxypropyl)amino, N-(2-hydroxypropyl)octylamine, N-(2-hydroxypropyl) octadecylamine, etc.

Alkylene amines having one or more hydroxyalkyl substituents on the nitrogen atoms also are contemplated for use in preparing the polar-substituted amines of this invention. Those having one hydroxy-alkyl substituent on a nitrogen atom in which the alkyl group is a lower alkyl group, i.e., having less than about 6 carbon atoms, are especially useful. Examples include N-(2-hydroxyethyl) ethylenediamine, N,N' - bis(2 - hydroxyethyl)ethylenediamine, 1-(2-hydroxyethyl)piperazine, monohydroxypropyl-substituted diethylenetriamine, 1,4-bis(2-hydroxypropyl) piperazine, di-(hydroxypropyl-substituted)tetraethylenepentamine, N - (3-hydroxypropyl)tetramethylenediamine, and 2-heptadecyl-1-(2-hydroxyethyl)imidazoline.

Higher homologues such as are obtained by condensation of the above-illustrated alkylene amines or hydroxy-alkyl-substituted alkylene amines through amino radicals or through hydroxy radicals are likewise useful. It will be appreciated that condensation through amino radicals results in the formation of a higher amine accompanied with ammonia and that condensation through the alcohol linkages results in products containing ether linkages and removal of water.

The ethylene amines are preferred. They are discussed in some detail under the heading, "Ethylene Amines," in "Encyclopedia of Chemical Technology," Kirk and Othmer, vol. 5, pages 989–905, Interscience Publishers, New York (1950). Such compounds are prepared most conveniently by the reaction of ethylene or propylene dichloride with ammonia. This process results in the production of somewhat complex mixtures of ethylene amines including cyclic condensation products such as piperazines and these mixtures find use herein. On the other hand quite satisfactory products may be obtained also from pure ethylene amine. An especially useful ethylene amine, for reasons of economy as well as effectiveness as a dispersant, is a mixture of ethylene amines prepared by the reaction of ethylene chloride with ammonia having a composition which corresponds to that of tetraethylene pentamine.

The following examples illustrate the preparation of the nitrogen-containing compositions of this invention (parts are by weight).

Example 1

A mixture of 100 parts of tall oil fatty acids and 2 parts of water is heated in an autoclave at 370° C. at a pressure of 550 p.s.i. for 1.5 hours and then subjected to distillation under vacuum. The distillate, 96.5 parts, is hydrogenated with a Raney nickel catalyst until its iodine number is reduced to about 7. The hydrogenated product is dissolved in a mixture of 90 parts of acetone and 10 parts of water and the solution is chilled to precipitate as a solid the hydrogenated product of the unused portion of the starting acid. The solvent in the liquid product is allowed to evaporate and the residue is a liquid isomerized acid (34 parts) having an iodine number of 10 and at least one branch-chain (shown by the infrared analysis.) A mixture of 200 parts of toluene, 340 parts (9.1 equivalents) of triethylene tetramine, 112 parts (3.2 equivalents) of dithylene triamine, and 1897 parts (6.3 equivalents) of the iso-aliphatic acid prepared according to the above procedure and having an acid number of 186 is heated at 140°–210° C. (reflux conditions) for 17.3 hours while water (195 parts) and toluene are removed by distillation. The residue is then heated to 165° C./3 mm. and yields an oil-soluble product (2150 parts) which has a nitrogen content of 8%.

Example 2

A mixture of 100 parts of tall oil acids, 2 parts of water, and 2 parts of mineral clay is heated at 230° C. for 3 hours and then subjected to distillation under vacuum. The distillate, 58 parts, has in iodine number of 103 and is hydrogenated in the presence of a Raney nickel catalyst until the iodine number is reduced to 8. The liquid isomerized acid product (obtained by the solvent extraction and precipitation method as described in Example 1) is found to have an iodine number of 11 and at least one branch-chain (shown by the infrared analysis). An oil-soluble composition is prepared from this acid with the amine mixture according to the procedure of Example 1.

Example 3

A mixture of 100 parts of oleic acid, 2 parts of water, and 4 parts of a mineral clay is heated at 230° C. for 3 hours and then subjected to distillation under vacuum. The distillate is hydrogenated in the presence of a Raney nickel catalyst until the iodine number is reduced to 6. The liquid isomerized acid product (obtained by the solvent extraction and precipitation method as described in Example 1) is found to have an iodine number of 8 and at least one branch-chain (shown by the infrared analysis). An oil-soluble, nitrogen-containing composition is prepared from this acid and the amine mixture according to the procedure of Example 1.

Example 4

A mixture of 495 parts (13 equivalents of tetraethylene pentamine, 2770 parts (8.7 equivalents) of the iso-aliphatic acid prepared according to the procedure of Example 1 and having an acid number of 186 and 300 parts of toluene is heated at 130°–220° C. for 10.5 hours, during which period a mixture of toluene and water (195 parts) is removed by azeotropic distillation. The residue is then heated to 160° C./2–3 mm. and filtered. The filtrate (3080 parts) is an oil-soluble product having a nitrogen content of 5.6%.

Example 5

An oil-soluble, nitrogen-containing composition is prepared by heating at 150°–162° C. a mixture of the iso-aliphatic acid of Example 1 (1 equivalent) and tetraethylene pentamine (5 equivalents).

Example 6

An oil-soluble, nitrogen-containing composition is prepared by the procedure of Example 5 except that 2-hydroxyethylamine (1 equivalent) is used in lieu of the tetraethylene pentamine used.

Example 7

An oil-soluble, nitrogen-containing composition is prepared by heating a mixture of dodecylamine (1 equivalent) and the iso-aliphatic acid of Example 1 (1 equivalent) at 150° C.

Example 8

An oil-soluble, nitrogen-containing composition is prepared by the procedure of Example 5 except that the tetraethylene pentamine is replaced with 2-aminoethyl-piperazine (1 equivalent).

Example 9

An oil-soluble, nitrogen-containing composition is prepared by the procedure of Example 5 except that the tetraethylene pentamine is replaced with N-(2-aminoethyl) octadecylamine (1 equivalent).

Example 10

An oil-soluble, nitrogen-containing composition is prepared by the procedure of Example 5 except that the tetraethylene pentamine is replaced with di-cyclohexyl-amine (2 equivalents).

An important characteristic of the products of this invention is their oil-solubility. This characteristic is associated with the structural constitution of the R radical of the products. In this regard, it is known in the art that amides and amidines of straight-chain, saturated aliphatic acids such as stearic acid are not soluble in a mineral oil. However, it is discovered in accordance with this invention that the products in which the R radical contains a pendant, acyclic aliphatic group are oil-soluble. They are soluble even though the aliphatic substituent is a lower alkyl radical such as ethyl or methyl radical which by itself is usually regarded not to possess a significant oleophilic character.

The criticality of the R radical is shown by the comparison that whereas the products obtained by the procedures of the above examples are soluble in SAE 40 mineral oil at concentrations of 1%, 5%, 10%, or even higher, the otherwise similar products prepared from stearic acid have been found not to be soluble in oil at the above stated concentrations.

The principal utility of the oil-soluble, nitrogen-containing compositions prepared by the process of this invention is as additives in the oil-fuel mixture for use in two-cycle internal combustion engines. In this application they are effective in reducing the engine wear and minimizing the tendency of the oil-fuel mixture to cause spark plug fouling and to form harmful engine deposits. Their effectiveness is shown by the results (Table I) of a two-cycle engine test. In this test a 60-horsepower, two-cycle, three-cylinder outboard motor is subjected to cycling operations, each cycle consisting of 55 minutes of full throttle operation (5500–5600 r.p.m.) and 5 minutes of idling (600–700 r.p.m.) under the following conditions: water inlet temperature, 78–82° F.; water outlet temperature, 140°–180° F.; and tank temperature, 95°–105° F. The test period is 50 hours unless excessive spark plug fouling is observed. The oil-fuel mixture used in the test consists of 720 parts (by volume) of a regular leaded gasoline having an octane number of 93–94 and 18 parts (by volume) of a SAE 40 mineral lubricating oil containing the chemical additive. The effectiveness of the additive is measured in terms of the piston cleanliness on a scale of 0 to 10 (0 being indicative of extremely heavy deposits and 10 being indicative of no deposit) and the average life of the spark plugs, i.e., the number of changes of spark plugs made necessary by fouling during the testing period.

TABLE I

| Test sample | Additive, percent by Weight of sample | Test period (hours) | Average plug life (hours) | Average piston rating |
|---|---|---|---|---|
| 1 | Example 2, 1.75% | 50 | 16.7 | 8.7 |
| 2 | Example 4, 1.1% | 50 | 10 | 8.5 |
| 3 | The product prepared 1.4% by the procedure of Example 4 except that the acid used was oleic acid. | 50 | | 4.7 |
| 4 | None | 50 | <5 | <5.5 |

The gasolines useful as the fuels for two-cycle engines may be of regular or premium grade having an octane number from about 80 to about 110. They may contain an anti-knock agent such as tetraethyl lead or tetramethyl lead and a scavenger such as ethylene dibromide or ethylene dichloride. In lieu of the gasoline, diesel fuel likewise is useful in two-cycle internal combustion engines. The lubricating base oils useful in the oil-fuel mixture for two-cycle engines are usually characterized by viscosity values from about 30 to about 200 SUS (Saybolt Universal Seconds) at 210° F. The most commonly used oils are the mineral lubricating oils having viscosity values from about 40 to about 120 SUS at 210° F. They are exemplified by mineral lubricating oils of SAE 10 to SAE 50 grades.

The relative proportions of the lubricating oil to the gasoline in the oil-fuel mixture may vary within wide ranges such as from a ratio of about 1:120 to a ratio of about 1:5, respectively, by volume. The preferred ratio is from about 1:10 to about 1:60, respectively, of the lubricating oil to the gasoline.

The oil-fuel mixtures for two-cycle engines may contain other additives such as metal-containing detergents, corrosion-inhibiting agents, oxidation-inhibiting agents, etc. The metal-containing detergents are exemplified by the alkaline earth metal salts of oil-soluble acids, e.g., mahogany sulfonic acid and didodecylbenzene sulfonic acid. The metal salts include both the normal salts and the basic salts, the latter describing the metal salts in which the metal is present in a stoichiometrically greater amount than the organic acid radical. Specific examples of the metal-containing detergents are calcium salt of mahogany sulfonic acid, strontium salt of mahogany sulfonic acid, basic barium salt of diodecylbenzene sulfonic acid obtained by carbonating a mixture of a mineral oil, a sulfonic acid and barium hydroxide (5 chemical equivalents per equivalent of the acid) in the presence of a promoting agent such as octylphenol (one equivalent per equivalent of the acid). Other metal-containing detergents include the alkaline earth metal salts of organic phosphorus acids prepared by the treatment of an olefin polymer (such as polyisobutene having a molecular weight of about 1000) with a phosphorus sulfide (such as phosphorus pentasulfide or phosphorus heptasulfide). These metal salts likewise may be normal or basic salts.

The corrosion-inhibiting agents and the oxidation-inhibiting agents are exemplified by phenolic compounds such as 2,6-dibutyl - 4 - methylphenol, 4,4'-methylene-bis (2-tert-butyl-6-isopropylphenol), 2-methyl-6-tert-butyl-4-heptylphenol, and sulfurized heptylphenol. Arylamines and sulfurized hydrocarbons likewise are useful as inhibiting agents. They include, for example, sulfurized dipentene (obtained by the reaction of two moles of dipentene with one mole of sulfur at 150° C.), the reaction product of turpentine (4 moles) with phosphorus pentasulfide (1 mole), N,N' - dibutyl phenylenediamine, N - phenyl napthylamine and dibutyl tetrasulfide.

The concentrations of the chemical additives in the oil-fuel mixtures depend to some extent upon the oils and fuels used and the types of service to which the oil-fuel mixtures are to be subjected. In most applications the nitrogen-containing composition of the invention is present in the oil-fuel mixture at concentrations ranging from 0.001% to about 2%, preferably from 0.01% to 3% by weight of the mixture. The concentration of the other additives may each range from 0.0001% to 2% by weight of the mixture.

The following examples illustrate further the fuel-oil mixtures containing the oil-soluble, nitrogen-containing compositions of this invention (the relative proportions of the fuel and the lubricating oil are expressed in parts by volume whereas the concentration of the additives are expressed in percentages by weight of the oil-fuel mixture).

Example A

SAE 20 mineral lubricating oil _____parts__ 1
Gasoline having an octane number of 98 ___do____ 20
The product of Example 1 _____percent__ 0.15

Example B

SAE 30 mineral lubricating oil _____parts__ 1
Gasoline having an octane number of 100___do____ 16
The product of Example 2 _____percent__ 0.05

Example C

SAE 50 mineral lubricating oil _____parts__ 1
Gasoline having an octane number of 85___do____ 30
The product of Example 3 _____percent__ 0.1

Example D

SAE 40 mineral lubricating oil _____parts__ 1
Gasoline having an octane number of 95 ___do____ 50
The product of Example 4 _____percent__ 0.05
4,4'-methylene-bis(2,6-ditert-butylphenol) __do____ 1

Example E

| | |
|---|---|
| SAE 60 mineral lubricating oil ............parts.. | 1 |
| Gasoline having an octane number of 99 ..do.... | 20 |
| The product of Example 1 ............percent.. | 0.025 |
| Barium salt of mahogany sulfonic acid ....do.... | 0.01 |

What is claimed is:

1. A mineral lubricating oil composition containing up to about 10% of the oil-soluble, nitrogen-containing composition prepared by the process comprising heating at a temperature above 150° C. a mixture comprising an amine selected from the class consisting of alkylamines, amino-alkylamines, and hydroxy-alkylamines, with an acid-producing compound selected from the class consisting of branched chain acids having the structural formula

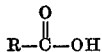

and the anhydrides and esters thereof wherein the alcoholic moiety of the ester is derived from an alcohol selected from the class consisting of alcohols boiling below 120° C., phenol, tolylol, and xylylol, in which structural formula R is a branched chain hydrocarbon radical having from 14 to about 20 saturated aliphatic carbon atoms in the principal chain and at least one pendant, lower acyclic aliphatic group, the reaction product being characterized by the presence of amidine linkages, the ratio of equivalents of acid-producing compound to amine being from 1:10 to 2:1.

2. The mineral lubricating oil composition according to claim 1 wherein the amine reactant is an alkylene amine.

3. The mineral lubricating oil composition according to claim 1 wherein said acid-producing compound is an aliphatic branched chain carboxylic acid having from 14 to about 20 saturated carbon atoms in the principal chain and at least one pendant lower alkyl group.

4. A mineral lubricating oil composition according to claim 1 wherein said oil-soluble, nitrogen-containing composition is prepared by the process comprising heating at a temperature above 150° C. a mixture comprising an alkylene amine and an aliphatic, branched chain carboxylic acid having from about 14 to about 20 saturated carbon atoms in the principal chain and at least one pendant lower alkyl group, the equivalent ratio of acid to amine being 1:1 to 1:2.

5. The mineral lubricating oil composition according to claim 4 wherein said alkylene amine is tetraethylene pentamine.

6. The mineral lubricating oil composition according to claim 4 characterized further in that the acid is obtained by the isomerization at a temperature above about 250° C. of an unsaturated fatty acid having from about 16 to about 20 carbon atoms.

7. The mineral lubricating oil composition according to claim 4 characterized further in that the alkylene amine is a mixture of ethylene amines having an average composition corresponding to that of tetraethylene pentamine.

8. An oil-fuel mixture suitable for use in 2-cycle engines comprising gasoline, and a mineral lubricating oil composition according to claim 1 wherein said mineral lubricating oil composition is present in the mixture in an amount such that from 0.01% to 3.0% of the oil-soluble, nitrogen-containing composition is present in the mixture.

9. An oil-fuel mixture suitable for use in 2-cycle engines comprising gasoline and a mineral lubrication oil composition according to claim 6 wherein said oil composition is present in the mixture in an amount such that from 0.01% to 3.0% of the oil-soluble, nitrogen-containing composition is present in the mixture.

References Cited

UNITED STATES PATENTS

| | | |
|---|---|---|
| 2,622,018 | 12/1952 | White et al. |
| 2,839,372 | 6/1958 | Lindstrom et al. _____ 44—66 |
| 2,839,373 | 6/1958 | Barusch et al. _____ 44—66 |
| 2,922,708 | 1/1960 | Lindstrom et al. _____ 44—58 X |
| 2,961,308 | 11/1960 | Andress _____ 44—63 |
| 2,962,439 | 11/1960 | Lauer _____ 44—63 X |
| 2,987,522 | 6/1961 | Shen _____ 44—63 X |
| 3,169,980 | 2/1965 | Benoit _____ 44—66 X |
| 3,251,664 | 5/1966 | Dickson et al. _____44—66 |
| 3,251,853 | 5/1966 | Hoke _____ 44—66 |
| 3,260,671 | 7/1966 | Trites et al. _____ 252—51.5 |

FOREIGN PATENTS

| | | |
|---|---|---|
| 219,994 | 2/1959 | Australia. |

DANIEL E. WYMAN, *Primary Examiner.*

W. J. SHINE, *Assistant Examiner.*